United States Patent [19]

Yetter

[11] Patent Number: 4,976,221
[45] Date of Patent: Dec. 11, 1990

[54] FACILITY FOR LIVESTOCK, FOWL AND OTHER ANIMALS

[76] Inventor: Lloyd E. Yetter, Box 97, Colchester, Ill. 62326

[21] Appl. No.: 78,643

[22] Filed: Jul. 28, 1987

[51] Int. Cl.⁵ .............................................. A01K 1/02
[52] U.S. Cl. ......................................... 119/20; 119/28
[58] Field of Search ................... 119/20, 28, 19, 27; 52/342, 633, 664, 668

[56] References Cited

U.S. PATENT DOCUMENTS

| | | | |
|---|---|---|---|
| 434,800 | 8/1890 | McDaniel | 119/20 |
| 1,867,702 | 7/1932 | Keown | 52/668 |
| 2,420,112 | 5/1947 | Utzler | 52/664 |
| 2,581,318 | 1/1952 | Bartlett | 119/20 |
| 2,607,455 | 8/1952 | Yellin | 52/664 |
| 2,753,841 | 7/1956 | Hawkins | 119/28 |
| 2,928,371 | 3/1960 | Baker | 119/20 |
| 3,105,462 | 10/1963 | Miller | 119/20 |
| 3,541,994 | 11/1970 | Meng | 119/20 |
| 3,861,108 | 1/1975 | Hartman | 119/28 X |
| 3,864,887 | 2/1975 | Arens | 52/664 |
| 3,884,188 | 5/1975 | Arends | 119/20 |
| 4,037,383 | 7/1977 | Diebold et al. | 52/664 |
| 4,348,986 | 9/1982 | Marrs | 119/20 |
| 4,680,910 | 7/1987 | Perk | 52/664 X |
| 4,760,680 | 8/1988 | Myers | 52/664 X |
| 4,761,930 | 8/1988 | Tepera | 52/664 X |

FOREIGN PATENT DOCUMENTS

| | | | |
|---|---|---|---|
| 636803 | of 1962 | Canada | 52/664 |
| 1201935 | of 1960 | France | 52/664 |
| 1295227 | of 1961 | France | 52/664 |
| 2247938 | 6/1975 | France | 52/664 |
| 852851 | of 1960 | United Kingdom | 52/664 |

*Primary Examiner*—Gene Mancene
*Assistant Examiner*—R. Thomas Price
*Attorney, Agent, or Firm*—Lowe, Price, LeBlanc, Becker & Shur

[57] ABSTRACT

A flooring panel is provided for livestock facilities by permitting size variation of the facilities without requiring substantial expenses for new molding and fabricating equipment. The panel is formed of extruded components and is easily assembled. A plurality of longitudinal rods are engaged by slots in a plurality of transverse cross members. The slots have a narrow opening and a wider dimension therebelow, while the rods are provided with a corresponding cross section. Alternatively, the slots may be described as having a transverse dimension, vertically displaced from the opening thereof, which is narrower than a transverse dimension further removed from the opening. Such an arrangement locks the rods in the slots and prevents vertical movement thereof. The cross members are formed of a material sufficiently flexible to permit assembly by tapping the rods into the slots using a hammer. Additional structure may provide longitudinal locking of the rods within the slots. The cross members are shaped to remain cleaner and thus to reduce the risk of bacterial infection of the livestock.

48 Claims, 7 Drawing Sheets

FACILITY FOR LIVESTOCK, FOWL AND OTHER ANIMALS

TECHNICAL FIELD

This invention relates to improvements in facilities for livestock, fowl and other animals. More particularly, the invention relates to farrowing crates, nursery pens, finishing pens and other facilities utilizing a lightweight, easily assembled flooring panel which eliminates numerous disadvantages of flooring panels previously used in such facilities.

BACKGROUND ART

Raised decks and slatted floors have been used for quite some time in livestock production of animals such as hogs. Such floors are used in farrowing crates, nursery pens, finishing pens, feeding stalls and other enclosures and facilities used in production and caring of livestock, fowl, and other animals.

A farrowing crate is a device in which a sow is placed before she is ready to farrow, or have pigs. If a sow farrows in an unconfined, open, lot she usually lays on or steps on the newborn pigs, killing a number of the pigs in the litter. Additionally, sows sometimes eat their offspring. Thus, left to their own devices the sows tend to reduce the productivity of a livestock grower.

Accordingly, farrowing stalls were developed to provide a confined area for the sow, approximately 24" wide by 7' long, to force the sow to lay down on her front feet, udder, and rear legs before rolling on her side rather than just flopping or rolling on her side as is her natural inclination when on an open lot. Thus, by preventing the sow from rolling or flopping to her side, farrowing crates increase hog production by reducing the number of newborn pigs killed by the farrowing sow.

The farrowing crates had previously been placed on a wood, concrete, or dirt floor in a building and a bedding of hay, wood chips, straw, corn cob or similar material provided for the sow and newborn pigs. However, numerous problems are associated with confining the sow to a farrowing crate with a wood, concrete or dirt floor. A nursing pig roots and, when located on concrete or wood floors, tends to rub off all of the skin at the front portions of its legs or joints. Thus, disease and infection is given an opportunity to set in. Moreover, wood, concrete and dirt harbor bacteria which increase the prospect for spread of disease to the sows and baby pigs confined to the farrowing crate.

When a bedding is used with the farrowing crate for the sows and pigs, the bedding becomes damp and wet from waste material such as manure and urine. Such an environment raises the susceptibility of the baby pigs to scours and other diseases. Such bedding is expensive to maintain since it must be changed at least once per day at great labor cost.

Accordingly, slatted floors of various types were developed for use with farrowing crates. Farrowing crates were thus typically raised a distance of approximately 12" from the floor, on a steel framework, and slats or other passageways provided in the flooring of the crate to permit waste to drop through the crate floor, onto the building floor below. In such an arrangement, bedding is not required, thus eliminating one problem in raising nursing pigs to weaning.

However, the types of slatted floors used in the prior art have themselves caused numerous problems for both the sows and the baby pigs. Such problems are due to the construction used in the slatted floors and are described below.

Injection molded flooring is usually molded in 1' by 2' sections in an injection molding process. The sections are snapped together with interlocks on the sides and ends of the flooring. The molds used to form such flooring is quite expensive, in the range between $40,000 and $100,000, for example. Accordingly, such flooring is one of the highest priced types of flooring on the market.

The material used in such injection molded floors is quite brittle, however, and is known to break when dropped on a cement floor from heights no greater than two or three feet. Moreover, great care is required to assemble the flooring because of the ease with which the interlocking tabs break off if the floor is not kept level at all times. Additionally, special floor supports and legs therefor are required. The large openings provided in such flooring permits the manure to pass therethrough, leading to build up on the support members which are hard to clean.

A significant disadvantage of injection molded flooring is the use of hard, brittle material therein which, among other problems, makes it quite difficult for the sow to get a footing on the flooring. Thus, when the sow attempts to stand in the crate her feet tend to slide on the flooring. Further, because such flooring is typically provided in fixed dimensions, the flooring cannot be used on existing frame works which thus must be replaced in order to install this type of flooring.

Another type of commonly available flooring is a woven wire flooring, which is less expensive than the injection molded flooring and is consequently one of the most extensively used flooring currently marketed. Such flooring is usually galvanized. However, the joints in the weave of such flooring wear through the galvanized material rapidly, permitting the waste to contact the ungalvanized metal surfaces which then deteriorate quite rapidly. Further, because the joints loosen, the rods used in the flooring spread to an extent permitting the pigs' feet to pass through the spread openings. Because of rust and corrosion, such flooring may last as little as three years.

The edges of woven wire flooring are quite sharp and require protection, in the form of leather gloves for example, when assembling. If the edges of the floor are exposed at joints between sections, pigs may receive severe cuts therefrom. Further, such flooring is quite hard on the feet and legs of the sows, sometimes creating problems so severe that the farmer must dispose of the sow. Moreover, when the sow lays on such a floor, abrasions are frequently caused in the shoulder and ham portions which may become infected, leading to veterinary expenses and possible loss of the sow. Still further, when a baby pig nurses it tends to scrape its leg over the flooring. Where sharp edges are present, as in this type of flooring, the baby pig may become infected.

Although manure passes through woven wire flooring better than through plastic coated flooring, the waste frequently builds up on the floor and needs to be washed down with a high pressure hose. The many joints and overlaps in the wire provide a location for accumulation of bacteria and further injury and disease to the confined animals. Cleaning such a structure becomes difficult in view of the many joints therein.

Concrete slatted floors have been used. Such floors are typically made in two ways. Sections of a fixed width (e.g., 4 feet) by various lengths (e.g., 8, 10 or 12 feet) may be provided. Alternatively, beams of concrete may be cast, approximately 4 to 6 inches in width and several feet in length. The beams are placed next to each other on pillars, and the livestock placed on top of the beams, over a waste catching pit.

However, special equipment, such as a tractor having a front end loader or a truck boom, is required to put the flooring in place. The concrete is highly abrasive, and is hard on the hogs' feet, as well as on nursing pigs who develop infection and disease as a result. Concrete is moreover quite porous, thus harboring bacteria and increasing the likelihood of disease in the livestock Inasmuch as the slots in the floor are widely spaced, manure buildup on the concrete is common. High pressure water is required to clean the accumulated waste from the top of the concrete slats, causing the concrete to absorb moisture and causing the livestock to be damp or wet most of the time spent on such a floor.

Steel slatted flooring is also used, and typically includes cross members of ¼" by 1" steel having stringers welded across the bottom thereof. Angle irons are set on the outside edges and the units are welded together. Such units are typically made in 12", 24" and 30" sections. Although inexpensive, such flooring lasts only a few years because of the high acidity levels of the waste contacting the steel. Such flooring typically had one inch spaces between the slots and, consequently, not all of the solid waste could pass therethrough, thus requiring much more time to keep clean. Steel flooring is much more abrasive on pigs than plastic floors, and is more porous thus providing more areas for bacterial growth.

Expanded metal plastic coated flooring is also used. Such flooring is made by using expanded steel sheets, and coating the same with plastic. However, the openings in this type of flooring are so small that there is insufficient room for the manure to pass. Thus, the manure packs into the diamond shaped openings and, when stepped on by the pigs, becomes still more solidly packed. It then becomes necessary to use a high pressure water hose to wash the accumulated manure through the floor, thus wetting the pigs and the sow. The moisture in turn leads to disease problems.

Still another draw back to such floors is the occasional cracking in the plastic coating used on the floor. Moisture is thus permitted to seep through the cracks to the metal, which deteriorates very rapidly unbeknownst to the farmer until a sow steps on a weakened area and her leg literally passes through the floor. The metal inside the flooring then becomes jagged and may cause severe cuts, which may lead to the sow bleeding to her death.

The 5' by 7' size of such flooring panels provides very heavy sheets, awkward to carry and position on the raised decks, and requiring at least two men to perform the task.

Plastic coated steel rods are used in a similar flooring, wherein rods are welded parallel to each other. The welded steel flooring is then coated with plastisol plastic to provide a plastic finish. The major disadvantages applicable to the plastic coated wire mesh flooring also apply to this type of flooring, although the coated rods clean somewhat better than the diamond shaped plastic Coated expanded steel. In view of the numerous joints present on this type of floor, there exists a much greater danger of cracking of the plastic, leading to a weak spot in the floor due to rapid deterioration of the metal in the floor. Such coated rods, however, are quite expensive.

There is thus a need for a less expensive flooring, having material which is flexible rather than brittle, is easily manipulated and assembled without requiring specialized equipment, comes in standard and custom made sizes to fit existing frames, does not deteriorate, presents no sharp edges to the animals, causes fewer injuries and disease, and is easy to clean and maintain.

DISCLOSURE OF INVENTION

It is accordingly an object of the present invention to overcome the disadvantages of the prior art, and to provide an improved facility, for livestock, fowl, or other animals, wherein improved floor paneling is used.

It is a more specific object of the invention to provide an improved facility using a floor which is easily assembled, is easily maintained, and presents reduced chance of injury and disease to the animals.

A particular object of the invention is to provide a facility such as a farrowing crate, a nursery pen, and the like, wherein a flooring is made of a plurality of longitudinal members supported by a plurality of cross members, the cross members having slots therein for engaging the longitudinal members.

Still a further object of the invention is the provision of a livestock facility including a flooring assembled by snapping, or tapping, longitudinal rods into engagement with slots forming in cross members.

It is an additional object of the invention to provide a flooring panel, for use in livestock, fowl and animal facilities wherein longitudinal rods are engaged by slots formed in cross members, the engaging arrangement including a locking structure to prevent withdrawal of the rods from the slots.

Still another object of the invention is to provide particular locking shape and structure for securely engaging a plurality of rods to a plurality of cross members, the rods and cross members being extruded materials which are assembled to fit arbitrary dimensions required by a customer.

Yet another object of the invention is to provide a flooring panel for facilities of livestock, fowl and other animals wherein plastic, metals such as aluminum, glass fiber, or other extruded or pultruded materials are used.

In accordance with these and other objects of the invention, there is provided a farrowing crate for confining a sow so that when lying down the sow can only go down on her front feet, her udder and her rear legs, for preventing the sow from rolling to her side and over her young. The crate includes a plurality of upstanding walls forming an enclosure having predetermined width and length dimensions for confining the sow. A permeated flooring panel is provided to permit waste to pass therethrough for collection externally of the farrowing crate. The flooring panel includes a plurality of slotted cross members, each having a plurality of correspondingly located slots. A plurality of longitudinal members are received in the plurality of corresponding slots of the cross members, the longitudinal members and the slots being shaped for engagement of one by the other. Moreover, locking means is provided for locking the longitudinal members in the slots relative to the cross members.

The locking means of the farrowing crate may include a protrusion from a wall of one of an engaging pair of the slots and longitudinal members and a corresponding notch in a wall of the other of the engaging pair of the slots and longitudinal members. Thus, the locking means is thereby made operable for locking the longitudinal members in the slots within the cross members.

Moreover, a longitudinal locking means may be provided for locking the longitudinal members from displacement relative to the cross members in a direction of the longitudinal axes thereof. The longitudinal locking means may include a plate attached to the cross members and blocking openings in the slots to prevent displacement of the longitudinal members through the openings.

The longitudinal members may have a substantially circular cross section, the cross section representing a major angle subtended by a chord and including the chord as a flat upper surface thereof.

Still further, the slots may include a portion having a substantially circular cross section for accommodating therein the longitudinal members. An opening may be provided in the slot, which opening is smaller than the diameter of the circular cross section of the longitudinal members, thereby locking the longitudinal members in the slots.

The portions of the longitudinal members, moreover, may include rounded corners for avoiding injury by collision of a pig walking thereon with a sharp corner thereof. Additionally, friction means may be provided thereon for improving traction of the pig walking thereover.

Alternatively, there is provided in accordance with the invention a flooring panel for livestock, fowl and other animals including the above described structure.

The longitudinal locking means of the invention may include an adhesive between a portion of each of the longitudinal members and a slot of a cross member engaged thereby. Alternatively, a pair of clips may be provided for gripping each of the longitudinal members. In this arrangement, for each longitudinal member one clip is mounted for gripping the longitudinal member on one side of a cross member and a second clip is mounted thereon for gripping the longitudinal member on an opposite of a cross member engaged thereby. The first and second clip means may, instead, be mounted on opposite sides of a single cross member or separate cross members engaged by the longitudinal member.

The longitudinal members and the slots may be frictionally or non-frictionally engaged to lock the longitudinal members in the slots. Moreover, the cross sections of the longitudinal rods and the slots may be the same, or may differ from one another.

Significantly, the cross members may be shaped to have a cross section with a downwardly decreasing transverse horizontal dimension. That is, a shape which may be downwardly tapered may be provided for reducing an opportunity for adherence to the cross members of waste material falling through spaces between the longitudinal members.

In accordance with another aspect of the invention, there is provided a method of assembling a flooring panel, including the steps of obtaining a plurality of longitudinal rods having a predetermined cross section, obtaining a plurality of stringers for the longitudinal rods, providing slots in the stringers having cross sections corresponding to the predetermined cross section of the rods for accommodating the rods therein, providing a non-frictional locking structure for lockingly engaging the rods in the slots, pressing the rods into the slots and engaging the rods in the slots.

The first obtaining step may include the step of extruding or pultruding the rods of a plastic or aluminum material, or of a glass fiber.

Advantageously, the first providing step may include the step of punching slots in the stringers to have a cross section with a narrow dimension close to an open end of the slot and a wider dimension than the narrow dimension further away from the open end of the slot, so that the rod may not be easily removed from engagement with the slot.

In a simplification of the prior art, the pressing step of the invention may include the step of using a common hammer for tapping the rods into the slots, thus avoiding requirements of complex machinery and equipment to assemble the flooring panels.

Other objects, features and advantages of the present invention will become readily apparent to those skilled in the art from the following description wherein there are shown and described a number of embodiments of the invention, simply by way of illustration and not of limitation of the best mode (and alternative embodiments) for carrying out the invention. The invention itself is set forth in the claims appended hereto. As will be realized upon examination of the specification with due reference to the drawings, the present invention is capable of still other, different, embodiments and its several details are capable of modifications in various obvious aspects, all without departing from the invention which is recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of the present invention and, together with the description, serve to explain the principles of the invention. In the drawings.

BEST MODE FOR CARRYING OUT THE INVENTION

Figures 1, 2:
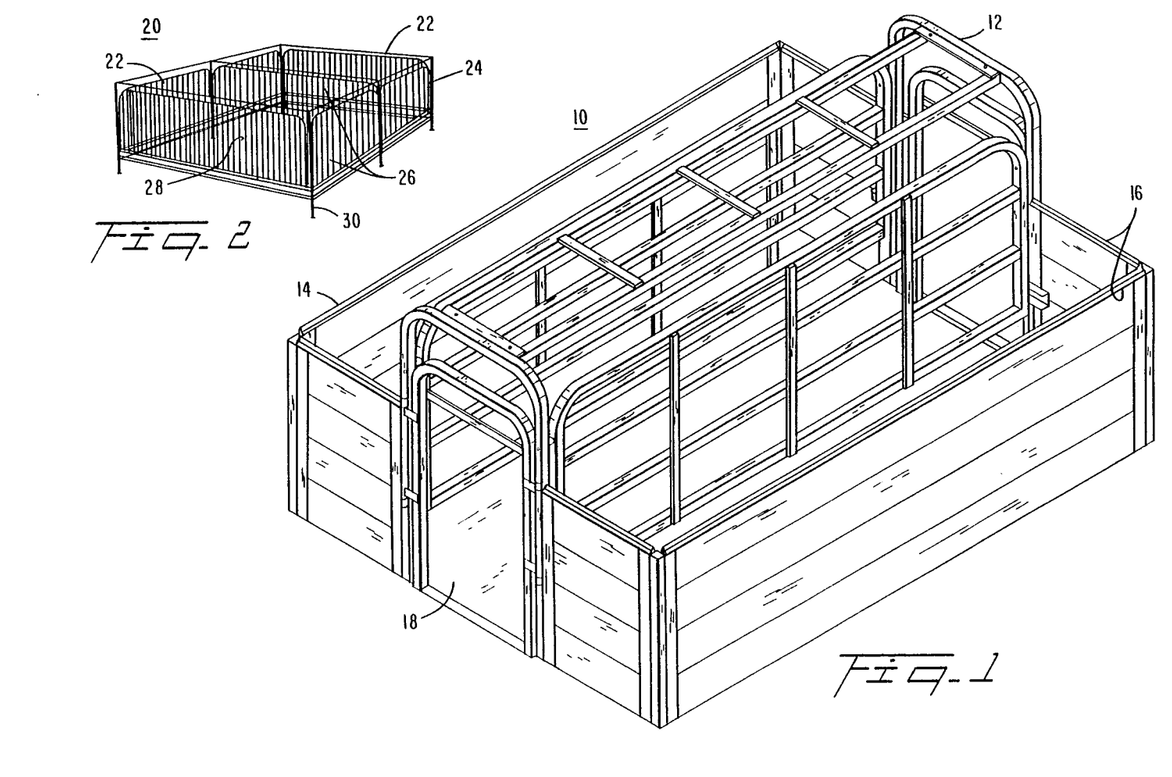
FIG. 1 shows a farrowing crate embodying the invention.
FIG. 2 shows a nursery pen embodying the invention.

In accordance with the invention, there is provided a pen, which may be a nursery pen, a finishing pen, a farrowing crate, a feeding stall or any other enclosure, for livestock, fowl, or other animals. In FIG. 1 there is generally shown at 10 a farrowing crate for hogs. As is known in the field of animal husbandry, such a farrowing crate typically includes one or more stall portions 12 and enclosures 14, which may include gates and other features.

The enclosure 14 is formed of a plurality of upstanding walls 16 and a frame supported floor portion 18, which incorporates the features of the present invention and is illustrated and described with greater detail in the following portions of the specification.

At FIG. 2 there is generally shown at 20 a typical nursery pen structure. Such a structure may include one or more individual pens 22, each formed of an enclosure 24 having upstanding walls 26 and a floor portion 28 incorporating the features of the invention.

As seen in FIG. 2, the nursery pen arrangement may be elevated from a ground level by a structure including a plurality of supporting legs 30. Both the farrowing crates and the nursery pens may include a flush tray, or other waste collection and disposal arrangement, beneath the flooring thereof. One type of flush tray which may be used therewith is disclosed in applicant's prior U.S. Pat. No. 4,656,067.

It is also known in the art that such structures may also be stationed at ground level, above a gutter portion for waste collection, however. Thus, nursery pens, for example, may comprise an enclosure formed of four gates and a flooring structure, and may be located over a gutter or pit which may be one, two or three feet deep, although depths may range from two inches to ten feet depending on the user's ability to remove the accumulated waste material. Such pens are typically arranged in groups rather than individually. A row of pens may be stationed in a building structure, or under a shelter, over an elongated gutter or pit used to collect and dispose of the waste materials from all of the pens in the row. The gutter or pit may be sloped along the width of the building or from one end of the building to the other, to permit cleaning by flushing or pumping.

Figure 3:
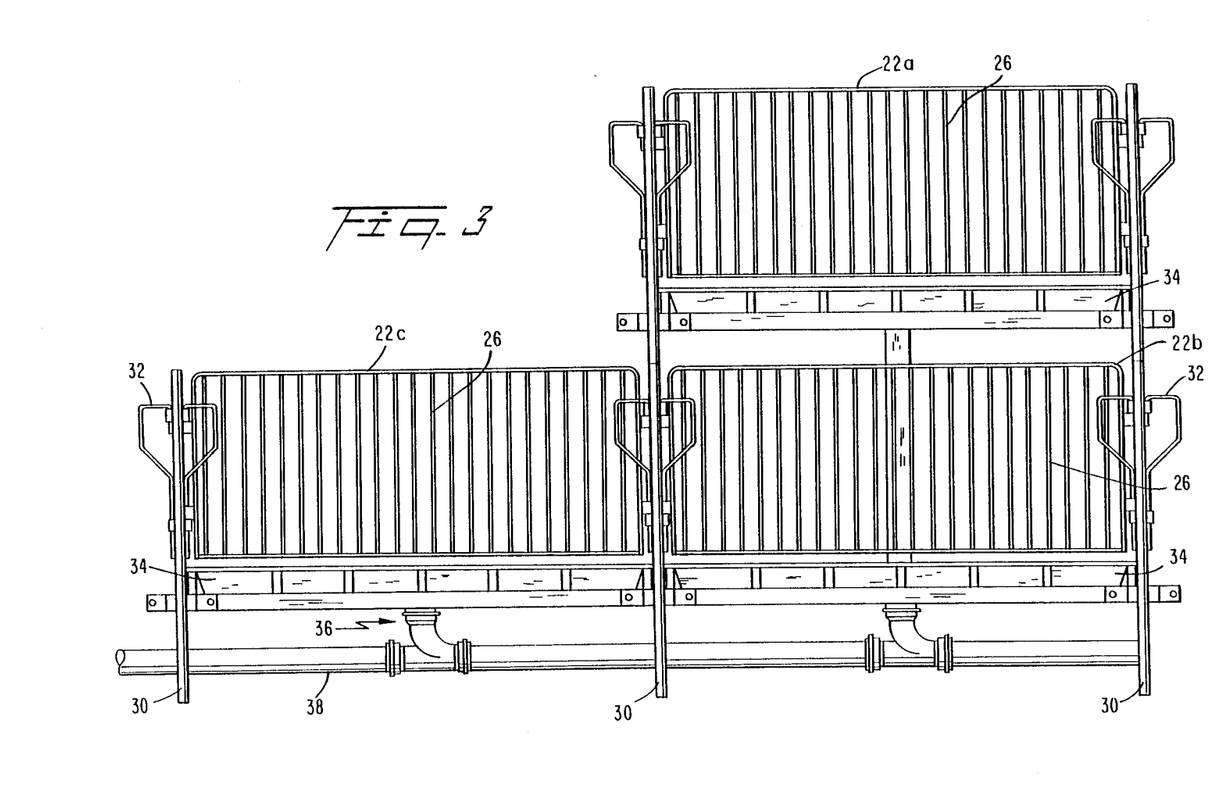
FIG. 3 illustrates an arrangement of a plurality of nursery pens.

Referring to FIG. 3, there is shown (in elevation) an arrangement of a plurality of nursery pens, or decks, elevated above ground and coupled to one another both horizontally and vertically. Therein, for illustrative purposes, three pens 22a, 22b and 22c are shown, elevated above a ground level by elevating legs 30. Coupling devices 32, which may include hook-and-latch arrangements, are provided for attaching horizontally adjacent pens. In the arrangement of FIG. 3, flush trays 34 of the type disclosed in applicant's above mentioned prior patent are provided beneath the flooring of each pen and a drainage system 36 provides connections from a drain of each flush tray 34 to a main drain pipe 38.

In each of the above described arrangements, a flooring incorporating the present invention is provided, whether above the flush tray, above a gutter or pit, or above ground. As previously described, the flooring of the invention is more easily fabricated, of lighter weight, is lower in cost, and reduces the number of injuries to the livestock supported thereby.

Figure 4:
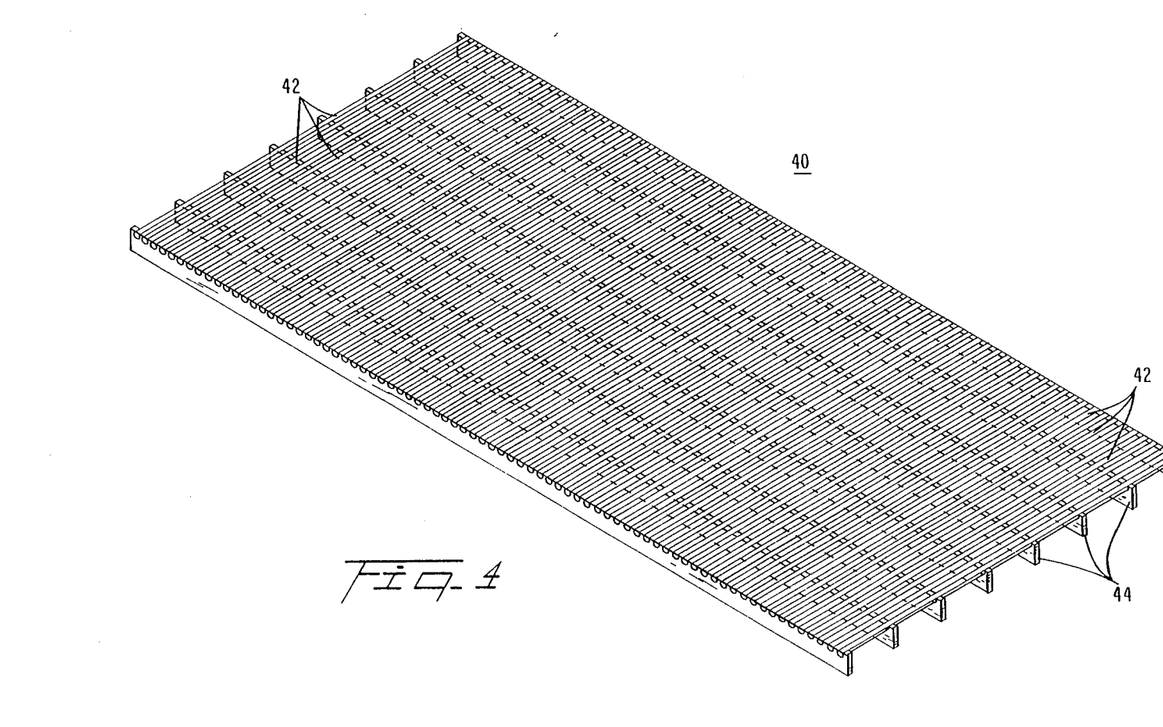
FIG. 4 is a perspective view of one embodiment of a floor panel according to the present invention

Referring specifically to FIG. 4, there is generally shown at 40 a floor panel embodying the present invention, as used in any of the above described livestock facilities. Preferably, the panel is comprised of a plurality of longitudinal members 42, in the form of rods, engaged in a plurality of substantially transversely oriented cross members 44. It is recognized, however, that the angular relationship between the longitudinal rods 42 and the cross members 44 need not be perpendicular and that other angles of intersection may be provided therebetween.

As described hereinbelow, the rods 42 are extruded from a metal, such as aluminum, or plastic, such as PVC. The cross members 44 are similarly extruded of the metal or PVC, and include a number of slots punched therein for engaging the rods. Alternatively, the rods and/or cross members may be pultruded glass fiber material, such as Fiberglas, a trademark of the DuPont company.

Figures 5, 6, 7:
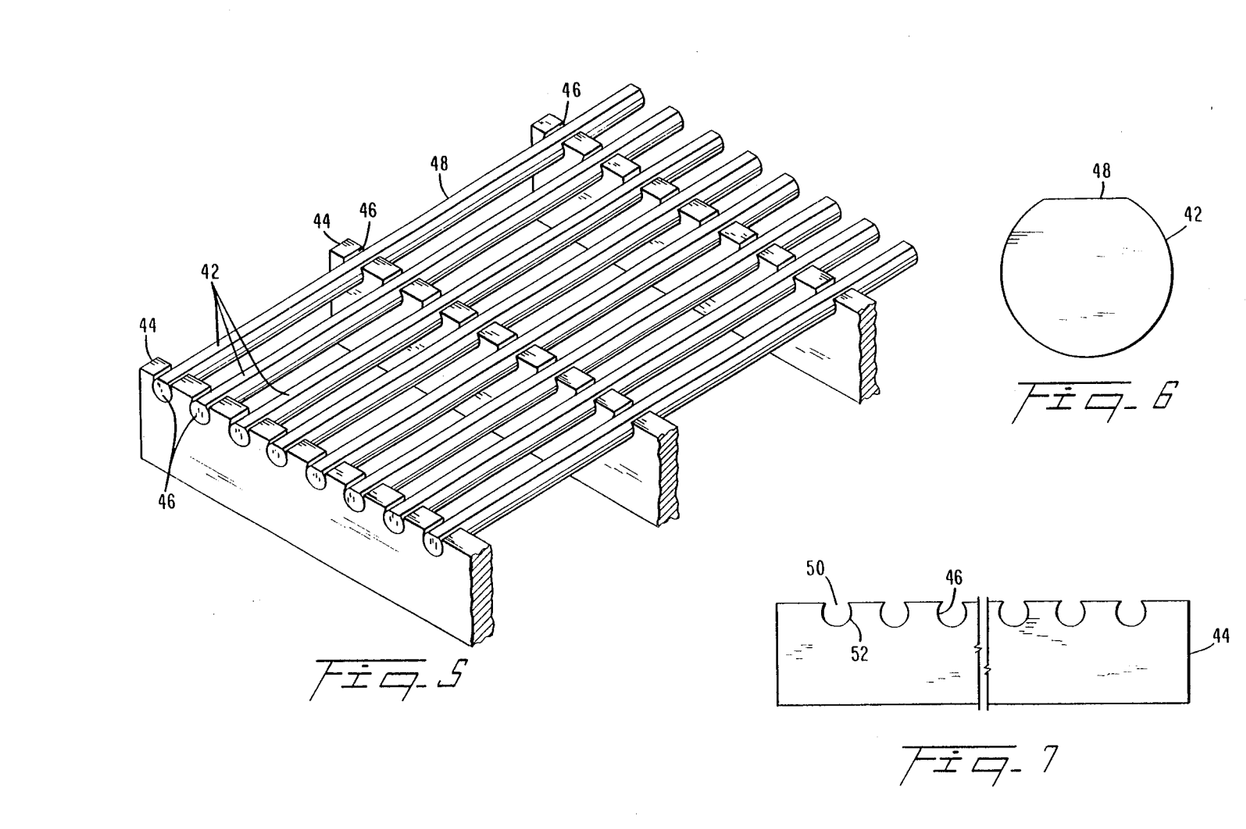
FIG. 5 is an enlarged view of a portion of the floor panel of FIG. 4.
FIG. 6 shows a side view of a rod of the embodiment shown in FIG. 5.
FIG. 7 shows a side view of one of the cross members of the embodiment shown in FIG. 5.

An enlarged view of a portion of the floor panel of FIG. 4 is shown in FIG. 5. As shown therein, each of the longitudinal rods 42 engages slots 46 provided in each of the cross members providing support therefor. The rods 42, which support the livestock thereon, are in turn supported by cross members 44. Slots 46 provide an arrangement for retaining the longitudinal rods in a predetermined spacing and orientation, and further for locking the rods in place.

As will be apparent from FIG. 5, the slots 46 have substantially the same shape as the cross-section of rods 42. The slots each include an opening therein. By forming the rods in a substantially circular cross-section as shown in the embodiment of FIGS. 4-5, it is possible to locate the corresponding substantially circular slots at any desired distance from the top portion of the cross members 44. Other cross-sections may be used, however, as shown in the other embodiments described hereinbelow.

The longitudinal rods 42 are provided with a flattened, or level, upper portion 48 in order to provide a level floor surface for the livestock. By selecting a chord which subtends a major portion of the cross sectional shape of the rods as the location of the flattened portion thereof, i.e., by providing a cross sectional shape wherein a minor arc thereof is replaced by a chord, it is seen that the rods are assured of including a cross sectional diameter which is wider than the flattened portion thereof.

Accordingly, slots 46 may be formed to follow the cross sectional shape of the rods 42 and to include an opening having a dimension narrower than the widest dimension of the rods. Thus, the rods are locked in place relatively to the cross members and cannot be moved out of engagement with the slots and away from the cross members 44. FIG. 6 shows a side view of one of the rods 42 of FIG. 5. The rod of the illustrated, currently preferred, embodiment has a diameter of 3/8 inch and the flattened upper portion 48 thereof is a chord of length 3/16 inch, narrower than the widest dimension of the rod (3/8") and replacing a minor arc (i.e., smaller than a semicircle) of the circle while leaving a major arc of the circle as the cross section. Other dimensions may be provided, however.

FIG. 7 shows a side view of one of the cross members of the embodiment shown in FIG. 5. Therein, a plurality of slots 46 are punched out, on predetermined centers, to accommodate lockingly therein the rods 42. As illustrated in FIG. 7, the slots may substantially match the cross sectional shapes of rods 42. Each of the slots include therein an opening 50 which has a smaller dimension than the diameter portion 52. In the preferred embodiment, the slots may be punched on centers spaced apart by ¾ inch and have diameters of 3/8 inch. The slot openings 50, similarly to the level portions 48 of rods 42, have a dimension smaller than the diameter of the rods. This dimension may be 20/1000 inch less than the rod diameter.

It will be appreciated from the above description that the slots 46 engage the longitudinal rods 42 in a substantially nonfrictional relationship. However, by making each of the dimensions of the slot smaller than that of the longitudinal rod, it is possible to provide friction or compression of rods 42 in order to retain the same within slots 46. It is sufficient that the opening 50 is smaller than a lateral dimension of the rod therebelow to prevent the rods from being easily withdrawn from the slots. By providing such a frictional or non-frictional engagement between the slots and rods, assembly of the inventive floor panels is made significantly simpler.

Figure 8:
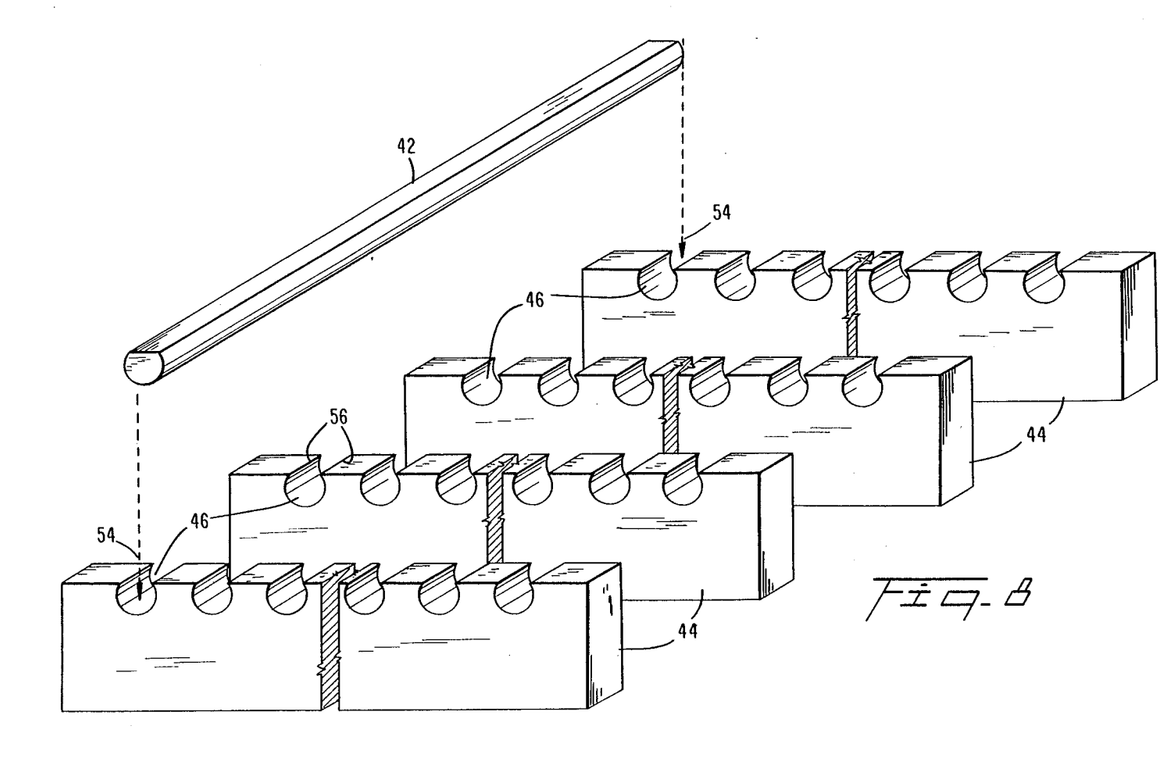
FIG. 8 illustrates a method of assembling the inventive floor panels.

FIG. 8 illustrates a method of assembling the inventive floor panels. As shown therein, a rod 42 is lowered in the direction of arrows 54 into engagement with a plurality of slots 46 in the various cross members 44 forming the panel structure. The material selected for use in the cross members is sufficiently flexible to permit lips 56 of openings 50 to flex wider, thus to present a sufficiently wide opening to permit the rod 42 to be snapped into place. Use of commonly available material for the cross members 44, such as aluminum or PVC as above noted, provides sufficient flexibility to permit the rods to be tapped into place by use of a common hammer. Generally, the flexibility of the material, the dimension of the necessary expansion of the narrow dimension of the slot to accommodate the wider dimension of the loongitudinal rod, and the force exerted by the hammer are interrelated in a manner well known to those skilled in the art.

Thus, the present invention advantageously permits assembly of the floor panel on-site, and provides simplified transportation to the ultimate location therefor. That is, instead of shipping completed bulky floor panels, of dimensions 5' × 7', for example, the present invention may be shipped as a package of 7' long rods and 5' long cross members. Alternatively, the panel may be fabricated on site, by extruding or pultruding the rods and cross members to measure, and assembling the rods and cross members without requiring special jigs or other apparatus therefor. As still a further alternative, a plurality of subassemblies, each 5 feet × 28 inches, for example, may be shipped to the consumer for final assembly.

The above described assembly accordingly provides a locking engagement of the rods 42 within slots 46 of cross members 44, wherein the lips 56 of the opening of the slot are more closely spaced apart than a dimension of the rods. Thus, longitudinal rods 42 are securely locked into engagement with the cross members 44 and cannot easily be withdrawn therefrom in the vertical direction, represented by arrows 54 in FIG. 8. However, other locking arrangements may be provided, in addition to or in place of the above described concept.

Referring now to FIGS. 9a-9m, there are shown therein a plurality of alternate embodiments for rods 42 and slots 46 of cross members 44. It will be appreciated that in each of the illustrated embodiments the rods are vertically locked in engagement with the slots. However, different cross sectional shapes are provided for enhanced security of the rods in the slots. As will be appreciated from the embodiments of FIGS. 9a-9m, it is not necessarily the opening of the slot which is smaller than the widest dimension of the rod. The inventive concept contemplates any cross section which has, at a first position having a first displacement from the opening thereof, a transverse dimension which is smaller than a transverse dimension of the rod at a second position having a second displacement from the opening which is greater than the first displacement. Such an arrangement is illustrated at FIG. 9f, for example.

Figure 9A:
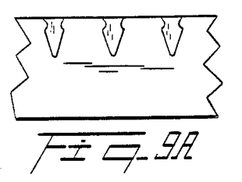
FIGS. 9a-9m show a plurality of alternate embodiments of the rods and slots used in the inventive floor panel.
Figure 9B:
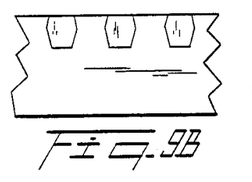
Figure 9C:
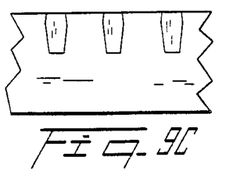
Figure 9D:
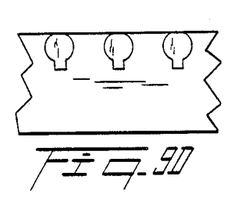
Figure 9E:
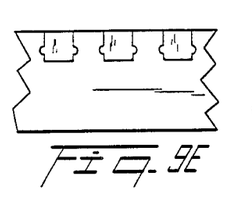
Figure 9F:
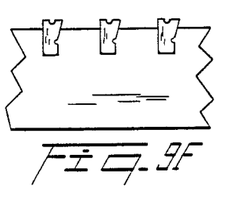
Figure 9G:
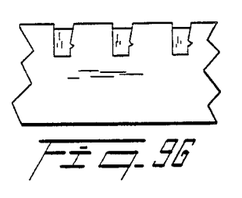
Figure 9H:
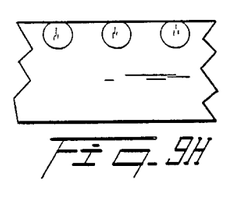
Figure 9I:
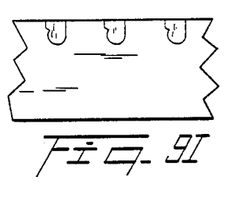
Figure 9J:
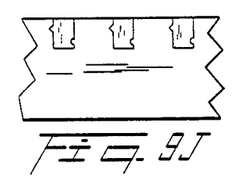
Figure 9K:
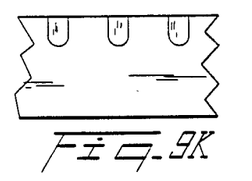
Figure 9L:
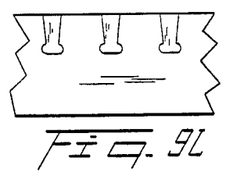
Figure 9M:
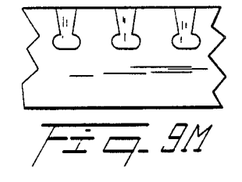

Thus, FIG. 9h shows the circular cross section of the embodiment hereinabove described. However, as shown in FIGS. 9a, 9e, 9f, 9g, 9i, 9j, 9l and 9m, further locking structures are provided in the form of mating protrusions and notches. The protrusion may be provided in the slot punched out from the cross member, as shown in FIGS. 9a, 9f, 9i, 9j, 9l and 9m, for example, and the matching notch provided in the extruded rod. Alternatively, the protrusion may be provided in the extruded rod and the notch provided in the punched out slot in the cross member, as shown in FIGS. 9e, 9g and 9j. There may be one such protrusion-notch arrangement for each slot, as illustrated at FIGS. 9f, 9g and 9i, or a pair of protrusions and notches may be presented for locking each rod into each slot, as illustrated at FIGS. 9a, 9e, 9j, 9l and 9m. Where a pair of protrusion-notch combinations is provided in the slots, both protrusions may be provided from the cross member and both notches provided in the rod, as shown in FIGS. 9a, 9l and 9m or the protrusions may be provided on the rod and the notches provided in the cross member, as shown in FIG. 9e. Of course, structures incorporating more than two sets of protrusion-notch combinations are also contemplated and encompassed by the present invention.

Alternatively, as shown in FIG. 9j, there may be provided one protrusion projecting from the cross member, at one side of the slot, and another protrusion, projecting from the rod, at the other side of the slot.

As further illustrated in the embodiment of FIG. 9f, it is possible for the longitudinal rods, when locked in place in the slots, to extend above the upper surface of the cross members. Alternatively, as shown in FIG. 9g, the rods may be recessed in the openings of the engaging slots. In order to reduce livestock injury, in the embodiments of FIGS. 9f and 9g the sharp corners may be rounded. Moreover, where the rods project beyond the openings of the slots, the upper surfaces thereof may be provided with a particular shape for improving the footing provided to the livestock Thus, as shown in the embodiment of FIG. 9f, the upper surface of the longitudinal rods may be grooved. Alternatively, the projecting upper surfaces may be knurled, notched, or coated with a friction-improving substance for this purpose.

Each of the above described shapes, however, is chosen to permit simple insertion and engagement of the longitudinal rods in the slots of the cross members.

In a situation wherein the rods are substantially circular, however, as shown in FIGS. 5 and 9h, there may also be provided a locking arrangement to prevent rotation of the circular rods within the circular slots. Thus, as shown in FIG. 9d, a vertical (or other) protrusion from the rod (or, as above described from the cross member) is used to key the rod into the slot.

As shown in FIG. 9b, the shape of the rod may not be circular, and may include no protrusion or notch, but may be vertically locked by the basic concept of the invention, wherein the transverse dimension of the slot is made smaller, at one point, than the transverse dimension of the rod at a point further removed from the opening. Thus, in the embodiments of FIGS. 9b and 9c the rods are extruded in the shapes of two trapezoids, having the wider base thereof below the opening of the slot. FIG. 9k shows an embodiment wherein the slots are provided with a transverse dimension which is selected to provide a frictional engagement of the rods.

In each of the above described embodiments, there is provided a vertical locking arrangement for the rods within the engaging slots provided therefor in the cross members of the floor panel.

Figure 10:
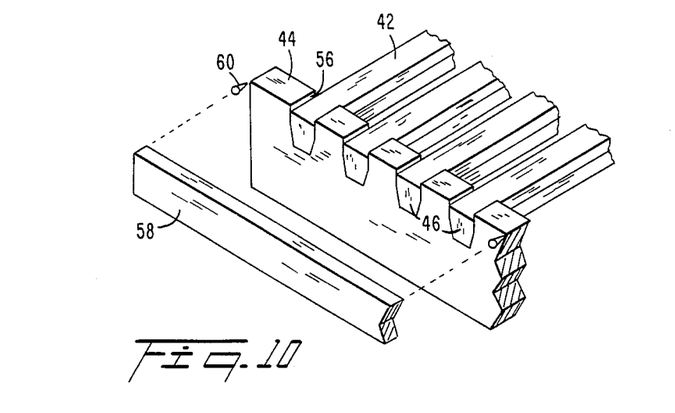
FIG. 10 shows a longitudinal locking arrangement for the rods and slots of the invention.

Referring now to FIG. 10, there is shown a further aspect of the invention. Therein, a longitudinal locking arrangement is provided to assure that the rods, which are vertically locked in the slots, do not slide longitudinally out of engagement therewith. More specifically, a locking strip 58 is provided across the side openings of slots 46 of that cross member which engages the ends of rods 42. Although only a single strip is shown in the partial view of FIG. 10, it should be appreciated that a similar strip is provided at the openings of the slots in the cross member engaging the other ends of the rods 42. The locking strip 58 may engage cross member 44 by being fastened thereto using one or more fasteners 60, such as nails, screws, or the like. Alternatively, the strips 58 may be bonded to the cross member 44, using commonly available adhesive bonding materials or glues therefor.

In an alternate arrangement, the rods 42 may be bonded to the internal surfaces slots 46 by commonly available adhesive bonding material to prevent relative longitudinal motion. Thus, a single drop of such adhesive material may be provided at one spot along an interface between the end of each rod and the slot engaged thereby, the adhesive material spreading by capillary action to provide adhesion between a substantial portion of the end of the rod and the slot. The adhesive material may be used whether the rods are frictionally or non-frictionally engaged by the slots.

In that regard, it should further be appreciated that such adhesive material may be used to provide or aid the vertical locking of the rods within the slots. Thus, the embodiment of FIG. 9k may utilize slots having dimensions which are selected for loose, rather than frictional, fit with the rods. By application of a drop of adhesive material, the rods may be vertically and longitudinally locked into engagement with the slots. Moreover, similarly to the provision of strips 58 for longitudinal locking in the embodiment of FIG. 10, similar strips (not shown) may be provided for vertically locking the rods in the slots, by attaching the same across the upper surface of one or more of the cross members, thus preventing removal of the rods from the slots.

Figure 11:
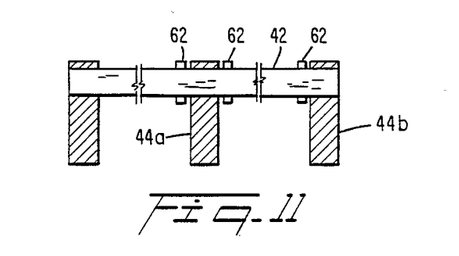
FIG. 11 shows another embodiment of a longitudinal locking arrangement for the rods and slots of the invention.

Yet another longitudinal locking arrangement is shown in the embodiment of FIG. 11. As shown therein a pair of clips 62 may be provided for each rod. Three such clips are shown in the Figure for illustrative purposes, to identify two of the possible arrangements therefor. Thus, a pair of clips may be attached to each rod on either side of a cross member, as shown with respect to cross member 44a. Alternatively, a pair of clips may be provided on opposite sides of separate cross members, as contemplated by the two clips between cross members 44a and 44b. Additional cross members may be present between the illustrated cross members 44a and 44b, so that the clips may be provided on the inner sides of the outermost cross members.

Such clips are provided with substantially the same cross section as the rods, and are in frictional engagement therewith to prevent movement of the rod. The clips may be adhesively bonded to the rods.

Figure 12:
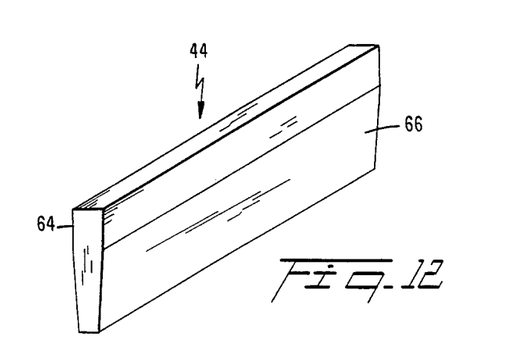
FIG. 12 shows a cross member of yet another embodiment of the invention.

Still a further embodiment of the invention is illustrated by the cross member shown in FIG. 12.

As has been hereinabove described, the floor panel of the invention is used in improved livestock facilities Such facilities, whether farrowing crates, nursing pens, finishing pens, feeding stalls or the like, each provide for passage of manure and other waste through the flooring panels thereof. In order to minimize growth of bacteria in the confines of the facility, it is desirable to maintain the facility in as clean a condition as possible. Towards that end, the cross member shown in FIG. 12 is provided with a cross section which has a decreasing, or tapered, dimension.

An upper portion 64 of the cross member is seen to have a substantially constant transverse dimension, for ease in punching out of slots 46 therein and stability in support of the longitudinal rods 42. However, a lower portion of the cross member, shown at 66, is provided with a tapered cross section. Thus, manure and other waste passing between the longitudinal rods, which falls substantially vertically, does not collide with or adhere to the lower portion 66 of the cross member. The tapered cross members of the floor panel thus remain cleaner, being relatively free of bacteria, and reduce the likelihood of illness and infection of the animals.

The foregoing description of the preferred embodiments of the invention has been presented for purposes of illustration and description and is not intended to be exhaustive or to limit the invention to the precise forms disclosed, since many modifications and variations are possible in light of the above teaching. The embodiments were chosen and described in order best to explain the principles of the invention an its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

I claim:

1. A farrowing crate for confining a sow so that when lying down the sow can only go down on her front feet, her udder and her rear legs, for preventing the sow from rolling to her side and over her young, comprising:

a plurality of upstanding walls forming an enclosure having predetermined width and length dimensions for confining the sow, a permeated flooring panel for permitting waste to pass therethrough for collection externally of the farrowing crate, said flooring panel including:

a plurality of slotted cross members, each having a plurality of correspondingly located slots;

a plurality of longitudinal members received in said plurality of corresponding slots of said cross members;

said longitudinal members and said slots shaped for engagement of one by the other; and locking means for locking said longitudinal members in said slots relative to said cross member, wherein said longitudinal members have a substantially circular cross section, said cross section representing a major angle subtended by a chord and including said chord as a flat upper surface thereof and wherein said slots include a portion having a substantially circular cross section for accommodating therein said longitudinal members and an opening to an upper surface of said cross members which is smaller than the diameter of said circular cross section of said longitudinal members, thereby locking said longitudinal members in said slots.

2. A farrowing crate as recited in claim 1 further comprising a support means for said flooring for raising said farrowing crate above a building floor.

3. A farrowing crate as recited in claim 1 wherein said longitudinal members are formed of a glass fiber material.

4. A farrowing crate as recited in claim 1 wherein said longitudinal members have an upper surface raised above an upper surface of said cross members engaged therewith.

5. A farrowing crate as recited in claim 1 wherein said upper portion of said substantially circular longitudinal members is substantially flush with an upper surface of said cross members engaged therewith.

6. A farrowing crate as recited in claim 1 wherein said upper portion of said substantially circular longitudinal members is included within said slot and is below the upper surface of said cross members engaged therewith.

7. A farrowing crate as recited in claim 1, wherein said cross members are shaped to have a cross section with a downwardly decreasing transverse horizontal dimension thereby reducing an opportunity for adherance to said cross members of waste material falling through spaces between said longitudinal members.

8. A farrowing crate for confining a sow so that when lying down the sow can only go down on her front feet, her udder and her rear legs, for preventing the sow from rolling to her side and over her young, comprising:

a plurality of upstanding walls forming an enclosure having predetermined width and length dimensions for confining the sow, a permeated flooring panel for permitting waste to pass therethrough for collection externally of the farrowing crate, said flooring panel including:

a plurality of slotted cross members, each having a plurality of corresponding located slots;

a plurality of longitudinal members received in said plurality of corresponding slots of said cross members;

said longitudinal members and said slots shaped for engagement of one by the other; and locking means for locking said longitudinal members in said slots relative to said cross members, wherein said locking means comprises a protrusion from a wall of one of an engaging pair of said slots and longitudinal members and a corresponding notch in a wall of the other of the engaging pair of said slots and longitudinal members, said locking means further comprising a second protrusion and a second notch, wherein said second protrusion projects from an opposite wall of said other of said engaging pair of said slots and longitudinal members and said second notch is formed in an opposite wall of said one of said engaging pair, said locking means thereby operable for locking said longitudinal members in said slots within said cross members.

9. A farrowing crate as recited in claim 8 wherein said cross members are shaped to have a cross section with a downwardly decreasing transverse horizontal dimension thereby reducing an opportunity for adherance to said cross members of waste material falling through spaces between said longitudinal members.

10. In a farrowing crate, the improvement comprising:

a flooring panel including:

a plurality of slotted cross members, each having a plurality of correspondingly located slots;

a plurality of extruded longitudinal members received in said plurality of corresponding slots of said cross members;

said longitudinal members and said slots shaped for engagement of one by the other; and locking means or locking said longitudinal members in said slots relative to said cross members, said locking means comprising a protrusion from a wall of one of an engaging pair of said slots and longitudinal members and a corresponding notch in a wall of the other of the engaging pair of said slots and longitudinal members, said locking means further comprising a second protrusion and a second notch formed in opposite walls of said other of said engaging pair of said slots and longitudinal members and said one of said engaging pair, said locking means thereby operable for locking said longitudinal members in said slots within said cross members.

11. An improved farrowing crate as recited in claim 10, wherein said plurality of slots of said cross members are arranged to receive said plurality of longitudinal members in a substantially parallel arrangement to one another, said longitudinal members received therein to form a predetermined angle between longitudinal axes thereof and longitudinal axes of said cross members.

12. An improved farrowing crate as recited in claim 11, wherein said predetermined angle is substantially a right angle.

13. An improved farrowing crate as recited in claim 11, wherein said slots define an insertion direction, substantially perpendicular to said longitudinal axes of said cross members, and said locking means comprises perpendicular locking means for preventing movement of said longitudinal members relative to said cross members in said insertion direction.

14. An improved farrowing crate as recited in claim 10, wherein said longitudinal members each include a portion substantially parallel to upper surfaces of said cross members, said portion of said longitudinal members disposed within said slots engaging said longitudinal members 15. An improved farrowing crate as recited in claim 14 wherein said portions of said longitudinal members include rounded corners for avoiding injury by collision of a pig walking thereon with a sharp corner thereof.

16. An improved farrowing crate as recited in claim 15 wherein said portions of said longitudinal members further include friction means thereon for improving traction of the pig walking thereover.

17. An improved farrowing crate as recited in claim 10, wherein said longitudinal members each include a portion substantially parallel to upper surfaces of said cross members, said portion of said longitudinal members disposed within said slots engaging said longitudinal members 18. An improved farrowing crate as recited in claim 17 wherein said portions of said longitudinal members include rounded corners for avoiding injury by collision of a pig walking thereon with a sharp corner thereof 19. An improved farrowing crate as recited in claim 18 wherein said portions of said longitudinal members further include traction means thereon for improving traction of the pig walking thereover.

20. A improved farrowing crate as recited in claim 10 wherein said cross members are shaped to have a cross section with a downwardly decreasing transverse horizontal dimension thereby reducing an opportunity for adherance to said cross members of waste material falling through spaces between said longitudinal members.

21. A farrowing crate for confining a sow so that when lying down the sow can only go down on her front feet, her udder and her rear legs, for preventing the sow from rolling to her side and over her young, comprising:
 a plurality of upstanding walls forming an enclosure having predetermined width and length dimensions for confining the sow,
 a permeated flooring panel for permitting waste to pass therethrough for collection externally of the farrowing crate,
 said flooring panel including:
 a plurality of slotted cross members, each having a plurality of correspondingly located slots;
 a plurality of longitudinal members received in said plurality of corresponding slots of said cross members;
 said longitudinal members and said slots shaped for engagement of one by the other; and
 locking means for locking said longitudinal members in said slots relative to said cross members,
 further comprising longitudinal locking means for locking said longitudinal members rom displacement relative to said cross members in a direction of longitudinal axes thereof,
 wherein said longitudinal locking means comprises plate means attached to said cross members and blocking terminal ones of said slots to prevent displacement of said longitudinal members through said slots.

22. A flooring panel for livestock, fowl and other animals comprising:
 a plurality of slotted cross members, each having a plurality of correspondingly located slots;
 a plurality of extruded longitudinal members received in said plurality of corresponding slots of said cross members;
 said longitudinal members and said slots shaped for engagement of one by the other; and
 locking means for locking said longitudinal members in said slots relative to said cross members,
 wherein:
 said plurality of slots of said cross members are arranged to receive said plurality of longitudinal members in a substantially parallel arrangement to one another, said longitudinal members received therein to form a predetermined angle between longitudinal axes thereof and longitudinal axes of said cross members,
 said slots define an insertion direction, substantially perpendicular to said longitudinal axes of said cross members, and
 said locking means comprises perpendicular locking means for preventing movement of said longitudinal members relative to said cross members in said insertion direction,
 wherein said longitudinal members have a substantially circular cross section, said cross section representing a major angle subtended by a chord and including said chord as a flat upper surface thereof and
 wherein said slots include a portion having a substantially circular cross section for accommodating therein said longitudinal members and an opening to an upper surface of said cross members which is smaller than the diameter of said circular cross section of said longitudinal members, thereby locking said longitudinal members in said slots.

23. A flooring panel as recited in claim 22, wherein said longitudinal members each include a portion substantially parallel to upper surfaces of said cross members, and
 said portions of said longitudinal members include rounded corners for avoiding abraision of a portion of anatomy of an animal walking thereon by a sharp corner thereof.

24. A flooring panel as recited in claim 23, further comprising traction means on said portions of said longitudinal members for improving traction of the animal walking thereover.

25. A flooring panel as recited in claim 22, further comprising longitudinal locking means for locking said longitudinal members from displacement in the direction of said longitudinal axes thereof relative to said cross members.

26. A flooring panel as recited in claim 25, wherein said longitudinal locking means comprises plate means attached to said cross members and blocking openings in said slots to prevent longitudinal displacement of said longitudinal members through said openings.

27. A flooring panel as recited in claim 25, wherein said longitudinal locking means comprises bonding means provided between a portion of each of said longitudinal members and a slot of a cross member engaged thereby.

28. A flooring panel as recited in claim 25, wherein said longitudinal locking means comprises a pair of clip means gripping each of said longitudinal members, for each longitudinal member one clip means being mounted thereon for gripping said longitudinal member on one side of a cross member engaged thereby and a second clip means being mounted thereon for gripping said longitudinal member on an opposite of a cross member engaged thereby.

29. A flooring panel as recited in claim 28, wherein said first and second clip means are mounted on opposite sides of a single cross member engaged by said longitudinal member.

30. A flooring panel as recited in claim 28, wherein said first and second clip means are mounted on opposite sides of separate cross members engaged by said longitudinal member.

31. A flooring panel as recited in claim 22 wherein said longitudinal members and said slots are frictionally engaged to lock said longitudinal members in said slots.

32. A flooring panel as recited in claim 22 wherein said longitudinal members and said slots have different cross sections.

33. A flooring panel as recited in claim 22 wherein said cross members are shaped to have a cross section with a downwardly decreasing transverse horizontal dimension thereby reducing an opportunity for adherance to said cross members of waste material falling through spaces between said longitudinal members.

34. A flooring panel for livestock, fowl and other animal comprising a plurality of slotted cross members, each having a plurality of correspondingly located slots;
   a plurality of extruded longitudinal members received in said plurality of corresponding slots of said cross members;
   said longitudinal members and said slots shaped for engagement of one by the other; and
   locking means for locking said longitudinal members in said slots relative to said cross members,
   wherein:
   said plurality of slots of said cross members are arranged to receive said plurality of longitudinal members in a substantially parallel arrangement to one another, said longitudinal members received therein to form a predetermined angle between longitudinal axes thereof and longitudinal axes of said cross members,
   said slots define an insertion direction, substantially perpendicular to said longitudinal axes of said cross members, and
   said locking means comprises perpendicular locking means for preventing movement of said longitudinal members relative to said cross members in said insertion direction,
   wherein said perpendicular locking means comprises a protrusion from a wall of one of an engaging pair of said slots and longitudinal members and a corresponding notch in a wall of the other of the engaging pair of said slots and longitudinal members,
   further comprising a second protrusion and a second notch corresponding to said second protrusion formed in opposite walls of said one of the engaging pair of said slots and longitudinal members and the other of said engaging pair of said slots and longitudinal members.

35. A facility for confining livestock, fowl and other animals to a predetermined area, comprising:
   a plurality of upstanding wall means forming an enclosure having said predetermined area for confining livestock, fowl and other animals,
   a permeated flooring panel for permitting livestock waste to pass therethrough for collection externally of the pen,
   said flooring panel including:
   a plurality of slotted cross members, each having a plurality of correspondingly located slots;
   a plurality of longitudinal members received in said plurality of corresponding slots of said cross members;
   said longitudinal members and said slots shaped for engagement of one by the other; and
   locking means for locking said longitudinal members in said slots relative to said cross members,
   said locking means comprising a protrusion from a wall of one of an engaging pair of said slots and longitudinal members and a corresponding notch in a wall of the other of the engaging pair of said slots nad longitudinal members,
   said locking means further comprising a second protrusion and a second notch formed in opposite walls of said other of said engaging pair of said slots and longitudinal members and said one of said engaging pair,
   said locking means thereby operable for locking said longitudinal members in said slots within said cross members.

36. A facility as recited in claim 35, wherein said facility comprises a nursery pen.

37. A facility as recited in claim 36, said nursery pen further including:
   elevating means for elevating said flooring panel above a ground level.

38. A facility as recited in claim 37, further comprising flush tray means below said flooring panel for collecting therein waste from livestock, fowl and other animals.

39. A flooring panel as recited in claim 38 wherein said cross members are shaped to have a cross section with a downwardly decreasing transverse horizontal dimension thereby reducing an opportunity for adherance to said cross members of waste material falling through spaces between said longitudinal members.

40. A livestock facility as recited in claim 35, wherein said facility comprises a finishing pen and said flooring panel comprises a finishing floor for livestock, fowl and other animals.

41. A method of assembling a flooring panel comprising the steps of:
   (a) obtaining a plurality of longitudinal rods having a predetermined cross section;
   (b) obtaining a plurality of stringers for said longitudinal rods;
   (c) providing slots in said stringers having cross sections corresponding to said predetermined cross section of said rods for accommodating said rods therein;
   (d) providing a non-frictional locking structure in said slots for lockingly engaging said rods in said slots to prevent vertical withdrawal of said rods from said slots;
   (e) pressing said rods into said slots and
   (f) engaging said rods and said locking structure in said slots, and
   (g) fixing a locking strip across openings of said slots after engaging said rods therein, thereby locking said rods longitudinally within said slots.

42. The method of claim 41 wherein said first obtaining step comprises the step of extruding said rods of a plastic material.

43. The method of claim 41 wherein said first obtaining step comprises the step of pultruding said rods of a glass fiber material.

44. The method of claim 41 wherein said first providing step comprises the step of punching slots in said stringers.

45. The method of claim 44 wherein said second providing step comprises the step of providing a protrusion in one of an engaging rod and slot and a corresponding notch in the other of said engaging rod and slot.

46. The method of claim 41 wherein said pressing step comprises the step of using a hammer for tapping said rods into said slots.

47. The method of claim 41 wherein said engaging step comprises the step of non-frictionally engaging said rods in said slots.

48. A flooring panel for livestock, fowl and other animals comprising:
- a plurality of slotted cross members, each having a plurality of correspondingly located slots;
- a plurality of extruded longitudinal members received in said plurality of corresponding slots of said cross members;
- said longitudinal members and said slots shaped for engagement of one by the other; and
- locking means for locking said longitudinal members in said slots relative to said cross members, wherein:
- said plurality of slots of said cross members are arranged to receive said plurality of longitudinal members in a substantially parallel arrangement to one another, said longitudinal members received therein to form a predetermined angle between longitudinal axes thereof and longitudinal axes of said cross members,
- said slots define an insertion direction, substantially perpendicular to said longitudinal axes of said cross members, and
- said locking means comprises perpendicular locking means for preventing movement of said longitudinal members relative to said cross members in said insertion direction,
- further comprising longitudinal locking means for locking said longitudinal members from displacement relative to said cross members in a direction of longitudinal axes thereof,
- wherein said longitudinal locking means comprises plate means attached to said cross members and blocking terminal ones of said slots to prevent displacement of said longitudinal members through said slots.

* * * * *